United States Patent [19]
Tani et al.

[11] Patent Number: 4,560,210
[45] Date of Patent: Dec. 24, 1985

[54] BRAKE SYSTEM FOR VEHICLES

[75] Inventors: Masanori Tani; Shin'ichi Eto; Takeshi Funakoshi, all of Aichi, Japan

[73] Assignee: Mitsubishi Jidosha Kogyo Kabushiki Kaisha, Japan

[21] Appl. No.: 521,602

[22] Filed: Aug. 9, 1983

[30] Foreign Application Priority Data

| Aug. 14, 1982 | [JP] | Japan | 57-141320 |
| Feb. 14, 1983 | [JP] | Japan | 58-19072[U] |
| Feb. 14, 1983 | [JP] | Japan | 58-19073[U] |
| Feb. 24, 1983 | [JP] | Japan | 58-25050[U] |
| Feb. 24, 1983 | [JP] | Japan | 58-25051[U] |

[51] Int. Cl.⁴ ............ B60T 8/18; B60T 8/26
[52] U.S. Cl. ............ 303/22 R; 303/22 A; 303/6 C; 188/195
[58] Field of Search ........ 303/22 R, 22 A, 114, 303/115, 116, 119, 6 C; 188/195, 349, 345

[56] References Cited

U.S. PATENT DOCUMENTS

| 3,306,678 | 2/1967 | Lepelletier | 303/22 R |
| 3,650,573 | 3/1972 | Inada et al. | 303/22 R |
| 4,453,778 | 6/1984 | Smith et al. | 303/22 R |

FOREIGN PATENT DOCUMENTS 15318375 12/1975 Japan.
0025373 2/1979 Japan ............ 303/22 R
0063954 5/1980 Japan ............ 303/22 R Primary Examiner—Duane A. Reger
Assistant Examiner—Alvin Oberley
Attorney, Agent, or Firm—Oldham, Oldham & Weber Co.

[57] ABSTRACT

A brake system for a vehicle comprises a booster unit including a piston disposed for sliding movement in a cylinder, a pressure chamber defined between the cylinder and the piston, and a valve member arranged for interlocking movement with the brake pedal and disposed slidably in the piston for controlling flow of hydraulic fluid from a fluid pressure source into the pressure chamber. A pressure control valve is disposed between the fluid pressure source and the booster unit for controlling the maximum internal pressure of the pressure chamber of the booster unit depending on the weight of the vehicle sensed by a sensor, and a master cylinder is connected to the piston of the booster unit to supply braking hydraulic fluid at controlled pressure to the front and rear brakes. When the vehicle is light-loaded or no-loaded, the pressure of braking hydraulic fluid supplied to the rear brakes is reduced to lower than that supplied to the front brakes so that the rear wheels may not be locked earlier than the front wheels.

7 Claims, 19 Drawing Figures

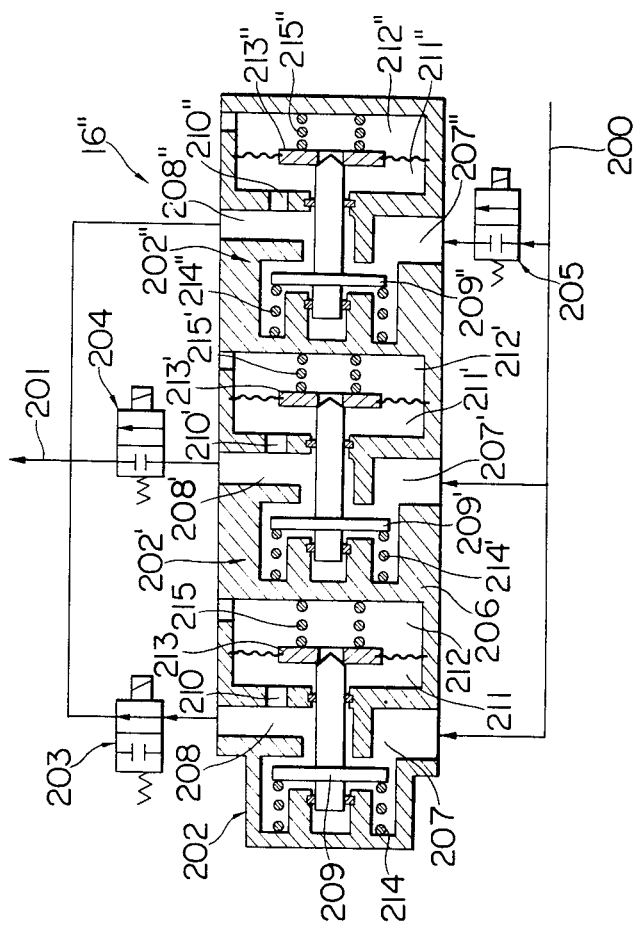

BRAKE SYSTEM FOR VEHICLES

BACKGROUND OF THE INVENTION

This invention relates to a brake system for automotive vehicles.

A brake system of a certain kind for automotive vehicles includes a booster unit which is disposed between the brake pedal and the master cylinder to amplify the brake pedal depression force so that sufficient braking force relative to the maximum speed and the weight of the vehicle can always be applied to the brakes and the brake pedal depression force can be reduced to alleviate the fatigue of the vehicle driver. In a booster unit employed hitherto in this field, there is a fixed relation between the brake pedal depression force and the amplified output of the booster unit. In a vehicle, especially, a commercial vehicle such as a truck, however, there is a great difference between the weight of the vehicle in a no-loaded condition and that in a full-loaded condition. It is therefore necessary to change the brake pedal depression force depending on the weight of the vehicle in order that the same deceleration can be attained in both of the no-loaded and full-loaded conditions. If the output of the booster unit were so set that sufficient braking force can be obtained even in a heavy-loaded condition of the vehicle, application of a small depression force to the brake pedal in a light-loaded condition of the vehicle would give rise to locking of the wheels thereby impairing the stability of braking. Further, since the brake pedal depression force and its reaction force are proportional to each other, a large reaction force increasing the fatigue of the driver will appear in a heavy-loaded condition of the vehicle.

Also, in such a brake system it is already known to provide a pressure control valve in the brake circuit connected to the rear brakes in order that the rear wheels may not be locked earlier than the front wheels when braked due to a shift of the load. The function of the pressure control valve is such that, as soon as the rear-wheel braking force exceeds a certain predetermined setting, the rate of increase of the rear-wheel braking force is reduced to lower than that of the front-wheel braking force. In a pressure control valve employed commonly hitherto in this field, the transition point at which the rate of increase of the rear-wheel braking force starts to be slowed down, is generally fixed. However, in order to maintain a high braking efficiency without causing locking of the rear wheels regardless of the weight of the vehicle, it is also necessary to change the distribution of the rear-wheel braking force to the front-wheel braking force depending on the weight of the vehicle.

SUMMARY OF THE INVENTION

It is therefore an object of the present invention to provide a novel and improved brake system for a vehicle in which means are provided for changing the output of the booster unit depending on the weight (the load plus the deadweight) of the vehicle in spite of application of the same depression force to the brake pedal, so that the same deceleration can always be attained regardless of the weight of the vehicle.

Another object of the present invention is to provide a brake system for a vehicle in which the distribution of the front-wheel and rear-wheel braking forces is changed to deal with a change of the weight of the vehicle so that the distribution of the front-wheel and rear-wheel braking forces can be adaquately maintained.

In accordance with the present invention, there is provided a brake system for a vehicle comprising booster means including a cylinder, a piston disposed for sliding movement in the cylinder, a pressure chamber defined between the cylinder and the piston, and a valve member arranged for interlocking movement with a brake pedal and disposed slidably in the piston for controlling flow of pressure fluid from a fluid pressure source into the pressure chamber; pressure control valve means disposed between the fluid pressure source and the booster means for controlling the maximum internal pressure of the pressure chamber of the booster means depending on the weight of the vehicle; and a master cylinder connected to the piston of the booster means to supply braking hydraulic fluid at controlled pressure to the front and rear brakes.

BRIEF DESCRIPTION OF THE DRAWINGS

The above and other objects, features and advantages of the present invention will become apparent from the following detailed description of preferred emodiments thereof taken in conjunction with the accompanying drawings, in which:

FIG. 19 is a sectional view of part of a seventh embodiment of the present invention.

DESCRIPTION OF THE PREFERRED EMBODIMENTS

Preferred embodiments of the present invention will now be described in detail with reference to the drawings.

Figure 1:
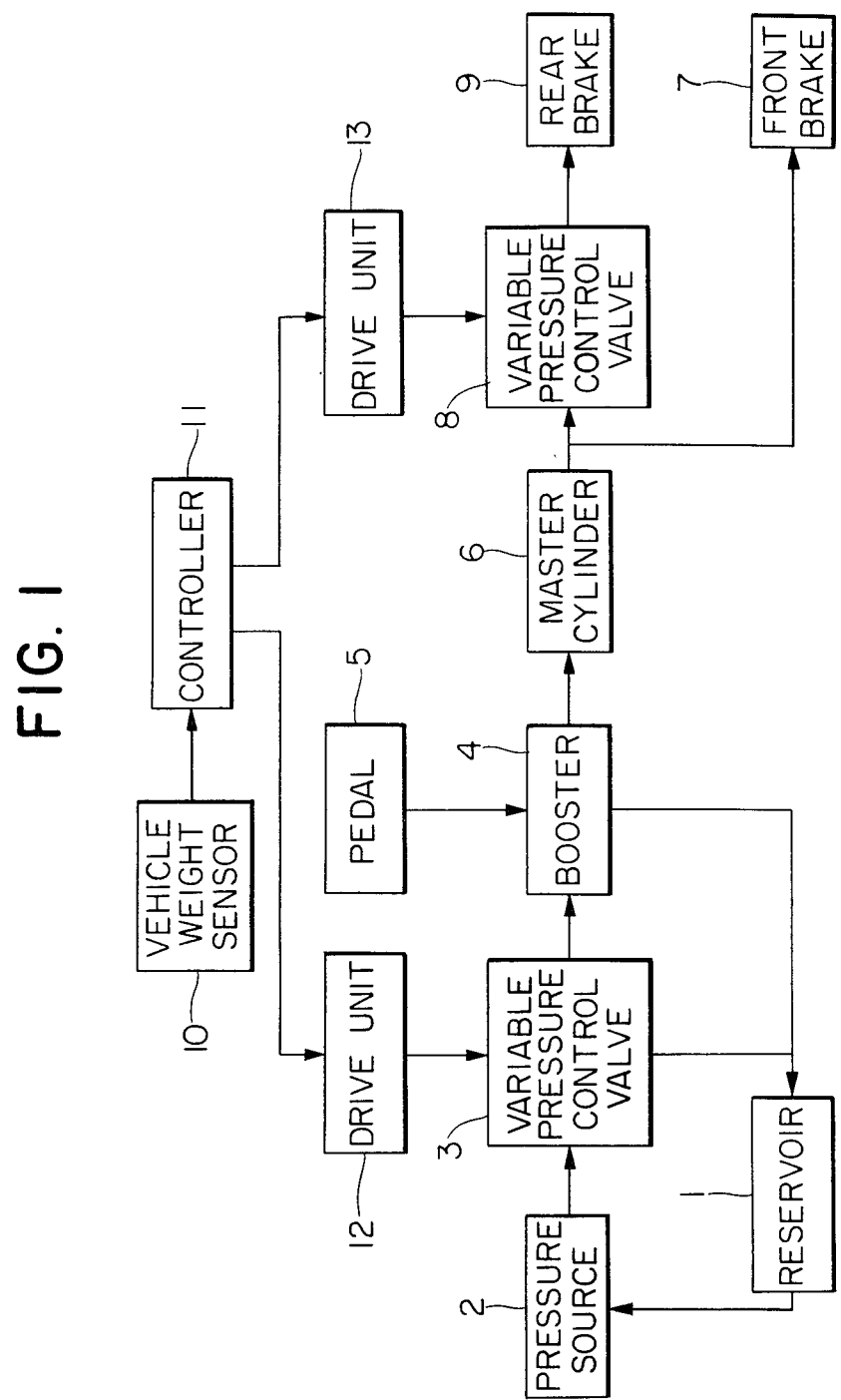
FIG. 1 is a block diagram of a first embodiment of the brake system according to the present invention.

FIG. 1 is a block diagram showing the general structure of a first embodiment of the hydraulic servo brake system according to the present invention.

Referring to FIG. 1, fluid is supplied from a fluid reservoir 1 to a fluid pressure source 2 such as a fluid pump, and fluid under pressure is supplied from the fluid pressure source 2 to a first variable pressure control valve 3 in which the flow rate of the hydraulic fluid is controlled depending on the weight (the load and the deadweight) of the vehicle. Then, the greater portion of the hydraulic fluid is supplied to a hydraulic booster unit 4, and the remaining portion thereof is returned to the reservoir 1. The hydraulic fluid supplied to the booster unit 4 actuates the booster unit 4 depending on the depression force imparted to a brake pedal 5 during braking, and the amplified hydraulic output from the booster unit 4 actuates a master cylinder 6. Upon release of the brake pedal depression force, the hydraulic fluid is returned to the reservoir 1. The braking hydraulic fluid from the master cylinder 6 is supplied directly to front brakes 7, while it is supplied to rear brakes 9 after its pressure is further controlled by a second variable pressure control valve 8 depending on the weight of the vehicle. A weight signal appearing from a vehicle weight sensor 10 sensing the displacement of the vehicle body relative to the wheels is applied to a controller 11, and, on the basis of the input signal, the controller 11 actuates a first drive unit 12 driving the first variable pressure control valve 3 for the flow rate control and actuates also a second drive unit 13 driving the second variable pressure control valve 8 for the pressure control.

The individual parts of the brake system shown in FIG. 1 will be described in detail.

Figure 2:
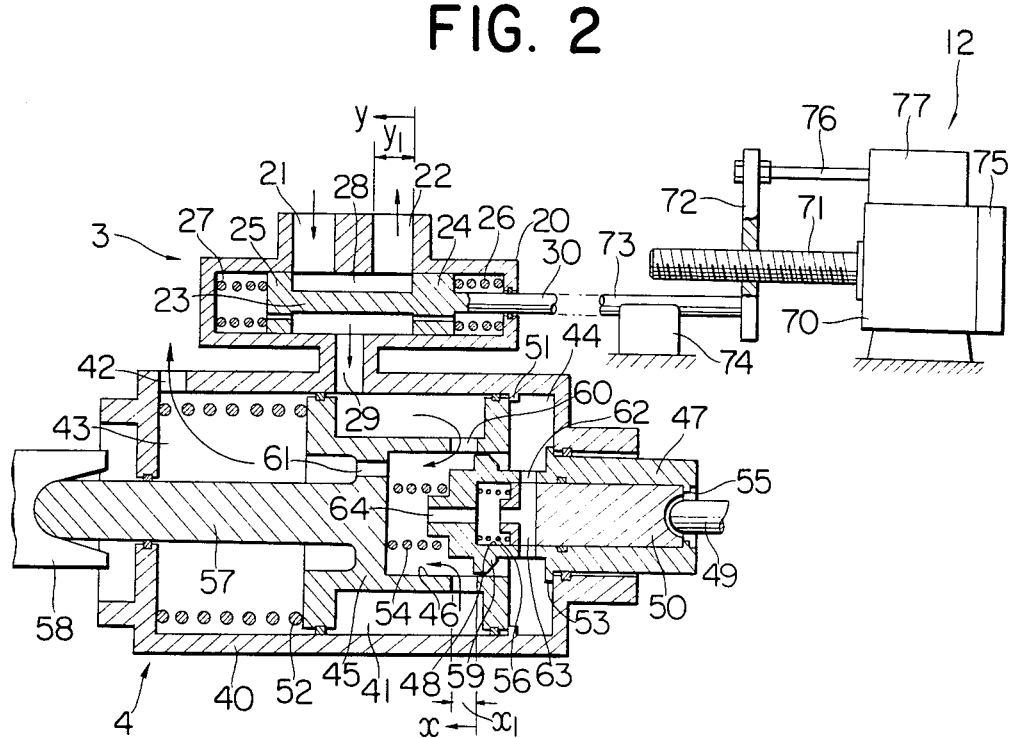
FIG. 2 is a sectional view of the first variable pressure control valve, booster unit and first drive unit in the first embodiment shown in FIG. 1.

Referring to FIG. 2, the first variable pressure control valve 3 includes a valve spool 23 slidably disposed in a cylinder 20 to control communication between an inlet port 21 connected to the fluid pressure source 2 and a return port 22 connected to the reservoir 1, and two springs 26 and 27 interposed between the cylinder 20 and lands 24, 25 of the valve spool 23 respectively. The valve spool 23 acts to regulate the opening of the return port 22 by its land 24 so as to control the maximum pressure of the hydraulic fluid which flows from a chamber 28 defined between the lands 24 and 25 to the booster unit 4 through an outlet port 29. A rod 30 extends from the land 24 of the valve spool 23 to be mechanically connected to the first drive unit 12.

The booster unit 4 includes a spool-shaped power piston 45 slidably disposed in a cylinder 40 to define an inlet chamber 41 communicating with the outlet port 29 of the valve 3, to define a return chamber 43 communicating with the reservoir 1 through a return port 42 and to define also a pressure chamber 44, a valve spool 47 slidably disposed in a cylindrical bore 46 of the piston 45 to control communication between the chambers 41, 43 and 44, a valve member 50 slidably disposed in a cylindrical bore 48 of the valve spool 47 and mechanically connected to a rod 49 arranged for interlocking movement with the brake pedal 5, a first spring 52 interposed between the cylinder 40 and the piston 45 to normally bias the piston 45 rightward in FIG. 2 to bring the piston 45 into engagement with a stopper 51, a second spring 54 interposed between the bottom wall of the bore 46 and the valve spool 47 to normally bias the valve spool 47 rightward to bring its stopper 53 into engagement with the cylinder 40, and a third spring 56 interposed between the bottom wall of the bore 48 and the valve member 50 to normally bias the valve member 50 rightward to bring the valve member 50 into engagement with a stopper 55 provided on the valve spool 47. A rod 57 extends from the piston 45 to be mechanically connected to a push rod 58 of the master cylinder 6.

In the brake-released position of the booster unit 4 shown in FIG. 2, a land 59 of the valve spool 47 is located on the right-hand side of a port 60 formed in the piston 45, and the inlet chamber 41 communicates with the return chamber 43 through the port 60, the bore 46 and another port 61 formed in the piston 45. A port 62 formed in the valve spool 47 registers with a T-shaped port 63 formed in the valve member 50, and the pressure chamber 44 communicates also with the return chamber 43 through the ports 62, 63, the bore 48 and another port 64 formed in the valve spool 47.

The drive unit 12 controls the position of the valve spool 23 of the first variable pressure control valve 3 so as to set maximum output of the booster unit 4 (the maximum hydraulic pressure in the pressure chamber 44) required for generating the optimum maximum braking force depending on the weight of the vehicle. The drive unit 12 includes a motor 70 rotated in a predetermined direction under control of the controller 11, a plate 72 making threaded engagement with a threaded shaft 71 coupled integrally to the rotary shaft of the motor 70, and an arm 73 mechanically connecting the plate 72 to the rod 30 extending from the valve spool 23 of the valve 3. The middle portion of the arm 73 is shaped in the form of a band, and this band portion of the arm 73 is slidably received in a slot of a block 74 secured to a stationary member to prevent rotation of the plate 72 relative to the shaft 71. Therefore, depending on the direction of rotation of the threaded shaft 71, the plate 72, arm 73, rod 30 and valve spool 23 move in either direction as a unit. The displacement of this valve spool 23 is measured by a rotation sensor 75 mounted on the motor 70 or by a displacement sensor 77 which detects directly the displacement of the free end of an arm 76 secured to the plate 72.

Figure 3:
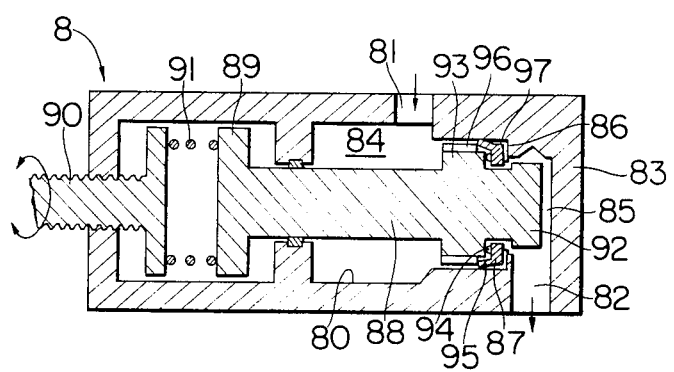
FIG. 3 is a sectional view of the second variable pressure control valve in the first embodiment shown in FIG. 1.

Referring to FIG. 3, the second variable pressure control valve 8 controls the pressure of braking hydraulic fluid supplied to the rear brakes 9 depending on the pressure of braking hydraulic fluid supplied from the master cylinder 6, depending on the pressure of hydraulic fluid in the rear brakes 9 and also depending on the weight of the vehicle. This second variable pressure control valve 8 includes a housing 83 formed with a steppd bore 80, an inlet port 81 connected to the fluid outlet of the master cylinder 6 and an outlet port 82 connected to the rear brakes 9, a piston-shaped valve member 88 slidably disposed in the bore 80 to define an inlet pressure chamber 84 and an outlet pressure chamber 85 and also to cooperate with an annular seal 87 mounted on a step portion 86 of the bore 80 for controlling communication between the two pressure chambers 84 and 85, and a spring 91 interposed between the large-diameter left-hand end 89 of the valve member 88 and an adjusting screw 90 making threaded engagement with the housing 83 to normally bias the valve member 88 rightward or toward the open position shown in FIG. 3.

In this open positin of the variable pressure control valve 8, the small-diameter right-hand end 92 of the valve member 88 is not engaged by the seal 87, and a land 93 of the valve member 88 is engaged by a plurality of projections 94 provided on the seal 87 in circumferentially spaced apart relation. Further, in the illustrated open position, an annular lip 95 of the seal 87 is in pressure engagement with the inner surface of the bore 80. Therefore, the inlet pressure chamber 84 communicates with the outlet pressure chamber 85 through a plurality of grooves 96 formed on the outer periphery of the land 93 and through the gap between the seal 87 and the valve member 88. The seal 87 is formed at its bottom and outer peripheral portions with grooves 97 which permit flow of the hydraulic fluid from the outlet pressure chamber 85 toward the inlet pressure chamber 84 when the brakes are released. The adjusting screw 90 is connected at the end (not shown) in rotary relation to the second drive unit 13 similar in structure to the first drive unit 12 shown in FIG. 2. When the adjusting screw 90 is rotated in one direction, it moves toward the valve member 88 to increase the set force of the spring 91, while when it is rotated in the opposite direction, it moves away from the valve member 88 to decrease the set force of the spring 91. In this case, it is required that the adjusting screw 90 is connected to the rotary shaft of the motor 70 by means such as a spline coupling, and the plate 72 is mounted on the coupling portion movable together with the adjusting screw 90.

The foundamental operation of the brake system will now be described.

When no depression force is imparted to the brake pedal 5, the booster unit 4 is in its brake-released position shown in FIG. 2. In that position of the booster unit 4, the hydraulic fluid from the fluid pressure source 2, whose flow rate is controlled by the first variable pressure control valve 3, returns to the reservoir 1 through the chamber 28, inlet chamber 41, return chamber 43 and return port 42 as shown by the arrows, and the fluid pressure in the pressure chamber 44 which is in communication with the return chamber 43 is low. Therefore, no output is applied from the booster unit 4 to the master cylinder 6.

When depression force is imparted to the brake pedal 5 for the purpose of braking, the valve member 50 is urged relative to the valve spool 47 while compressing the spring 56 through the rod 49, and the port 62 is closed by the valve member 50 to interrupt communication between the pressure chamber 44 and the return chamber 43. At the same time, the brake pedal depression force transmitted through the spring 56 acts to urge the valve spool 47 relative to the piston 45 while compressing the spring 54, and the land 59 of the valve spool 47 is brought to about the center of the port 60 to permit communication between the inlet chamber 41 and the pressure chamber 44 through the port 60. Consequently, a portion of the hydraulic fluid fed into the inlet chamber 41 from the chamber 28 flows into the pressure chamber 44 to start to increase the internal pressure of the pressure chamber 44, and the power piston 45 is urged leftward in FIG. 2 against the force of the spring 52. Therefore, an output actuating the master cylinder 6 is transmitted through the rods 57 and 58.

With further impartation of the depression force, the land 59 of the valve spool 47 is now brought to the left-hand side of the port 60, thereby interrupting communication between the inlet chamber 41 and the return chamber 43. Consequently, the full quantity of the hydraulic fluid fed into the inlet chamber 41 flows into the pressure chamber 44 to further increase the internal pressure of the pressure chamber 44, and the maximum output is applied to the master cylinder 6 from the booster unit 4.

The braking hydraulic fluid produced by the operation of the master cylinder 6 is supplied directly to the front brakes 7 and is also supplied to the inlet pressure chamber 84 of the second variable pressure control valve 8. Since the valve member 88 of this valve 8 is normally in its open position shown in FIG. 3, the hydraulic fluid flows into the outlet pressure chamber 85 through the gap between the seal 87 and the valve member 88 and is then supplied to the rear brakes 9 to apply a rear-wheel braking force equal to the front-wheel braking force.

The outlet pressure in the outlet pressure chamber 85 acting upon the right-hand end 92 having a large pressure receiving area provides a force tending to urge the valve member 88 leftward. Further, the combination of the inlet pressure in the inlet pressure chamber 84 acting upon the left-hand peripheral portion of the land 93 having a small pressure receiving area and the force of the spring 91 provides a force tending to urge the valve member 88 rightward. Therefore, with the increase in the pressure of the hydraulic fluid supplied from the master cylinder 6, the inlet pressure and the outlet pressure increase equally. When finally the point (which will be referred to hereinafter as a transition point) at which the leftward and rightward urging forces balance each other is exceeded, the leftward urging force overcomes the rightward urging force to urge the valve member 88 leftward. The right-hand end 92 of the valve member 88 approaches the seal 87 to limit communication between the inlet pressure chamber 84 and the outlet pressure chamber 85. After the transition point is exceeded, the outlet pressure is maintained at a level lower than the inlet pressure in a relation proportional to the ratio between the two pressure receiving areas of the valve member 88. As a result, after the transition point is exceeded, the rate of increase of the rear-wheel braking force is maintained lower than that of the front-wheel braking force thereby preventing locking of the rear wheels.

When the depression force having been imparted to the brake pedal 5 is released for releasing the brakes, the valve spool 47 and valve member 50 are forced back toward the positions shown in FIG. 2 by the forces of the springs 54 and 56, and the inlet chamber 41 and pressure chamber 44 communicate again with the return chamber 43. The hydraulic fluid in the chambers 41 and 44 is discharged to the reservoir 1. Consequently, the power piston 45 is returned by the spring 52, and the output from the booster unit 4 to the master cylinder 6 is also released.

At the same time, due to the pressure drop of the hydraulic fluid from the master cylinder 6, the pressure of the hydraulic fluid supplied to the front brakes 7 and second variable pressure control valve 8 also drops. Due to the drop of the inlet pressure in the inlet pressure chamber 84 of the valve 8, the leftward urging force increases to bring the right-hand end 92 of the valve member 88 into engagement with the seal 87 thereby interrupting communication between the pressure chambers 84 and 85. The outlet pressure higher than the inlet pressure acts upon the lip 95 through the grooves 97 to move the lip 95 away from the surface of the bore 80, with the result that the hydraulic fluid in the rear brakes 9 is discharged into the master cylinder 6 through the outlet pressure chamber 85, through the gap between the lip 95 of the seal 87 and the bore 80 and through the inlet pressure chamber 84. When the rightward urging force overcomes the leftward urging force due to the drop of the outlet pressure, the valve member 88 is urged to the open position shown in FIG. 3 again, and the hydraulic fluid in the rear brakes 9 is completely discharged into the master cylinder 6 through the gap between the seal 87 and the valve member 88.

The above description has referred to the operation of the brake system when the weight of the vehicle is fixed or not changed. When, on the other hand, the weight changes, the maximum fluid pressure that can be produced by the booster unit 4 is regulated by the first variable pressure control valve 3 to meet such a change of the weight thereby controlling the maximum output of the booster unit 4 and the maximum pressure of the braking hydraulic fluid from the master cylinder 6, so that the desired deceleration can always be attained regardless of the change of the weight. Also, since the valve of the ratio between the outlet pressure and the inlet pressure in the second variable pressure control valve 8 is a constant determined by the ratio between the two pressure receiving areas of the valve member 88, and the since these pressure receiving areas are also constant, the outlet pressure is proportional to the force of the spring 91, that is, the outlet pressure is increased or decreased by increasing or decreasing the force of the spring 91. Therefore, when the force of the spring 91 is changed in a relation corresponding to a change of the vehicle weight, the transition point for the rear-wheel braking force is also changed so that the desired distribution of the front-wheel and rear-wheel braking forces can be obtained.

To this end, the vehicle weight sensor 10 senses the weight W of the vehicle and applies the weight signal indicative of the sensed weight W to the controller 11. On the basis of the weight signal, the data representing the maximum fluid pressure of the output from the booster unit 4 and the force of the spring 91 in the second variable pressure control valve 8, suitable for the sensed weight W, are fetched by the controller 11 from a table of pre-set characteristic data, and the required displacements of the valve spool 23 and adjusting screw 90 are determined by the controller 11 to drive the motors 70 of the drive units 12 and 13. Also, the controller 11 compares the predetermined displacements of the valve spool 23 and adjusting screw 90 with the actual displacements detected by the rotation sensor 75 or displacement sensor 77 for the purpose of feedback control.

Such a control mode will now be described. When, for example, the sensed weight W of the vehicle is $W_1$ corresonding to, for example, a no-loaded condition, the motor 70 of the first drive unit 12 is rotated in one direction by an amount corresponding to the value $W_1$ under control of the controller 11, so that the plate 72 and the valve spool 23 of the first variable pressure control valve 3 connected integrally to the plate 72 are moved leftward by a relatively small amount. As a result, the opening of the return port 22 is set at a predetermined maximum by the land 24 of the valve spool 23 to reduce the flow rate of the hydraulic fluid flowing from the chamber 28 into the inlet chamber 41 of the booster unit 4. Therefore, the maximum fluid pressure that can be produced in the pressure chamber 44 during braking is limited to a certain low level.

On the other hand, when the vehicle weight W sensed by the weight sensor 10 is $W_3$ corresponding to a full-loaded condition, the motor 70 is further rotated by a corresponding amount under control of the controller 11, and the plate 72 and valve spool 23 are further moved leftward to limit the opening of the port 22 to a predetermined minimum or completely close this port 22. Therefore, the maximum fluid pressure that can be build up in the pressure chamber 44 during braking is set at a certain high level or at the maximum pressure of the hydraulic fluid supplied to the inlet port 21, so that the maximum output of the booster unit 4 is increased.

When the vehicle weight W is intermediate between the values $W_1$ and $W_3$, that is, for example, $W_2$ which is a predetermined intermediate value corresponding to a light-loaded condition, the valve spool 23 is moved by the motor 70 to a predetermined intermediate position under control of the controller 11. The opening of the port 22 is set at a predetermined intermediate value, and the maximum fluid pressure that can be built up in the pressure chamber 44 and the maximum output of the booster unit 4 are set at predetermined intermediate values.

Such a control mode will be described in further detail.

The quantity Q of the hydraulic fluid flowing into the valve 3 and booster unit 4 through the inlet port 21 is given by $$Q = KS\sqrt{2g(Pa - Po)}$$

where
K: flow coefficient
S: sectional area of fluid passage (the sum of sectional area at portions $x_1$ and $y_1$ in FIG. 2 $=Sx+Sy$)
g: acceleration of gravity
Pa: internal pressure of chamber 28
Po: pressure at outlet port 22.

When the flow rate of the hydraulic fluid is fixed, the internal pressure Pa of the chamber 28 increases with the decrease in the sectional area S of the fluid passage. The sectional area S of the fluid passage is $S=Sx+Sy$, where $Sx=f(x_1-x)$ meaning that Sx is a function of $(x_1-x)$, and $Sy=f(y_1-y)$ meaning that Sy is a function of $(y_1-y)$.

The symbol y represents the displacement of the rod 30, and $y=y_1$ when the fluid passage is completely closed by the land 24. The symbol x represents the displacement of the valve spool 47 relative to the power piston 45, and $x=x_1$ when the fluid passage is completely closed by the valve spool 47.

Therefore, the internal pressure Pa of the chamber 28 increases when the relative displacement x of the valve spool 47 is reached as a result of movement of the valve spool 47 urged by the depression force transmitted from the brake pedal 5 through the rod 49. At this time, the same fluid pressure as the internal pressure Pa of the chamber 28 builds up in the chamber 41 and also in the chamber 44 opened by the relative displacement x of the valve spool 47, as described already. This fluid pressure provides the output of the booster unit 4.

When the displacement y is previously given, the sectional area S of the fluid passage is smaller than when y=0 regardless of the same displacement x. Therefore, regardless of the same displacement x caused by depression of the brake pedal 5, the output from the booster unit 4 is higher.

On the other hand, although the reaction force appearing due to the depression of the brake pedal 5 is determined by the repulsive force of the spring 54, this force of the spring 54 is determined by the displacement x of the valve spool 47 relative to the power piston 45.

This means that the same depression force imparted to the brake pedal 5 provides the same relative displacement x. Therefore, when the displacement y is previously given, the same brake pedal depression force can produce different fluid pressures (or higher fluid pressure in this case).

Figure 4:
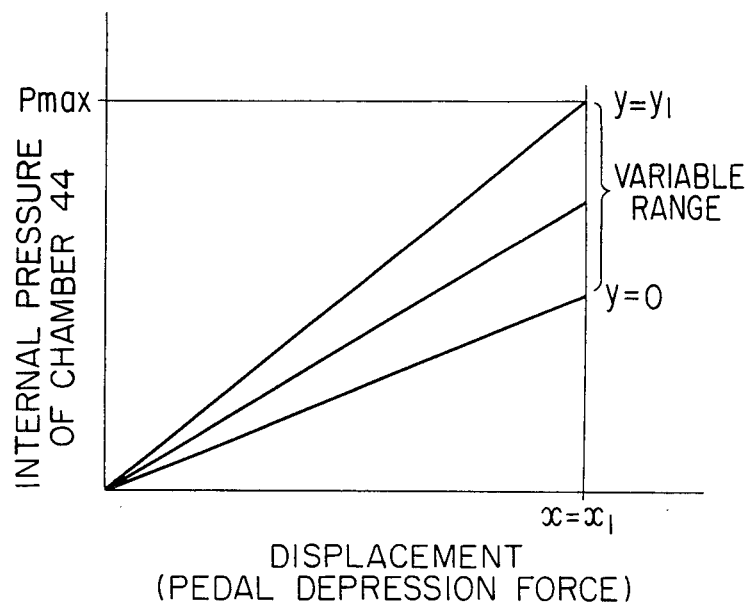
FIG. 4 is a graph showing the relation between the fluid pressure and the pedal displacement in the first embodiment shown in FIG. 1.

FIG. 4 shows how the internal pressure of the chamber 44 is variable depending on the given values of the displacements x and y. Referring to FIG. 4, the internal pressure of the chamber 44 provides the maximum fluid pressure Pmax that can be supplied from the inlet port 21 when the ports 60 and 22 are completely closed to provide the relations $x=x_1$ and $y=y_1$. It will be seen from FIG. 4 that the gradient of fluid pressure build-up in the chamber 44 responding to the brake pedal depression force is variable depending on the given value of the displacement y.

The braking force Fb required for braking the vehicle of weight W at a deceleration $\alpha$ is given by $Fb=W\alpha$, and the force Fm/c required to be applied to the master cylinder 6 to generate the required braking force Fb is expressed as $Fb=kFm/c$, where k is a constant determined by various factors of the brake system.

This force Fm/c is generated by the rod 57 in the booster unit 4. Further, this force is provided by the combination of the leftward urging force of the rod 49 actuated by the brake pedal depression force and the fluid pressure built up in the chamber 44 of the booster unit 4. The rod 49 is mechanically connected to the brake pedal 5. Consequently, the required braking force Fb is provided by the combination of the brake pedal depression force Fp and the force Fo produced by the internal pressure of the chamber 44 in the booster unit 4.

Suppose now that the weight W of the vehicle changes to $(W+\Delta W)$. Then, it is necessary to change the braking force by $\Delta Fb=\Delta W$ in order to attain the same deceleration $\alpha$ as that attained before the weight is chagned.

Therefore, by previously setting the position of the land 24, hence, the displacement y so that the fluid pressure corresponding to $(Fb+\Delta Fb)$ can be produced in the booster unit 4 while maintaining the same displacement x, the same depression force Fp imparted to the brake pedal 5 can provide the same deceleration $\alpha$ by application of the increased braking force $(Fb+\Delta Fb)$.

When the sensed vehicle weight W is $W_1$, the motor 70 of the second drive unit 13 is rotated by the amount corresponding to $W_1$ under control of the controller 11 to rotate the adjusting screw 90 in one direction theregby urging it to the predetermined leftwardmost position, so that the force of the spring 91 biasing the valve member 88 rightward in the second variable pressure control valve 8 is set at its predetermined minimum. As a result, the outlet pressure at the transition point is reduced to a certain low level. On the other hand, when the sensed vehicle weight W is $W_3$, the motor 70 of the second drive unit 13 is correspondingly driven under control of the controller 11 to rotate the adjusting screw 90 in the opposite direction until it is urged to its predetermined rightwardmost position. As a result, the force of the spring 91 is set at its predetermined maximum, and the outlet pressure at the transition point is raised to a certain high level. When the sensed vehicle weight W is $W_2$ which is intermediate between $W_1$ and $W_3$, the adjusting screw 90 is brought by the drive unit 13 to a predetermined intermediate position between the leftwardmost and rightwardmost positions under control of the controller 11, and the force of the spring 91 and the outlet pressure are set at predetermined intermediate values.

Figure 5:
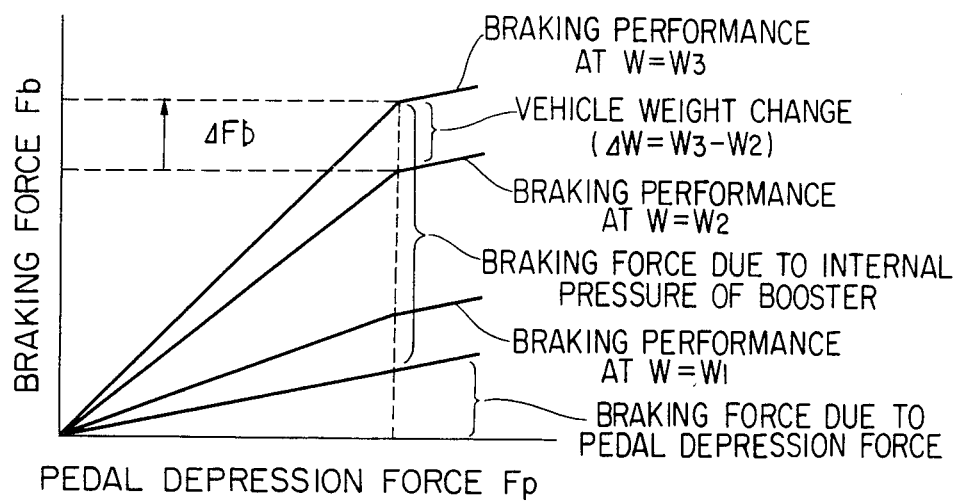
FIG. 5 is a graph showing the relation between the pedal depression force and the braking force in the first embodiment shown in FIG. 1.

Such an operation of the second variable pressure control valve 8 is effected in synchronous relation with the operation of the first variable pressure control valve 3. Consequently, the braking hydraulic fluid at the pressure changing continuously to meet the corresponding change of the vehicle weight is directly supplied from the master cylinder 6 to the front brakes 7 in spite of the same brake pedal depression force, thereby exhibiting the characteristic of the front-wheel braking force as shown in FIG. 5. In the case of the rear brakes 9, the braking hydraulic fluid is applied thereto after being reduced to a different level when so required. Thus, the front-wheel braking force and the rear-wheel braking force have various proportions as shown by the solid curves in FIG. 6.

Therefore, according to the first embodiment of the present invention, the same brake pedal depression force can provide the same deceleration regardless of a change of the weight of the vehicle, and impartation of a small depression force to the brake pedal 5 in a light-loaded condition can prevent locking of the rear wheels, so that the desired braking stability and high braking efficiency can be maintained regardless of the vehicle weight.

Figure 6:
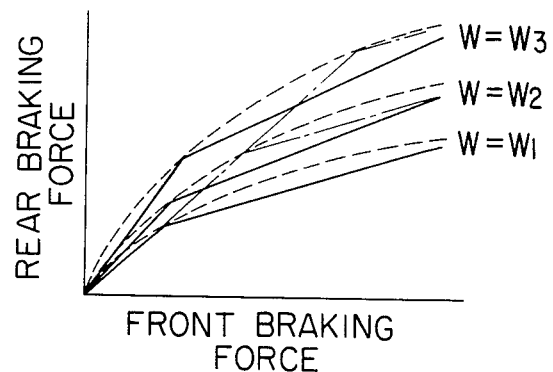
FIG. 6 is a graph showing the relation between the front-wheel braking force and the rear-wheel braking force in the first embodiment shown in FIG. 1.

In FIG. 6, the chain curves represent the distribution of the front-wheel and rear-wheel braking forces controlled by the variable pressure control valves 3 and 8 in the case where the front-wheel braking force, that is, the pressure of the braking hydraulic fluid from the master cylinder 6 does not change in spite of a change of the vehicle weight, while broken curves represent the ideal distribution of the front-wheel and rear-wheel braking forces.

In the aforementioned embodiment, the set force of the spring 91 in the second variable pressure control valve 8 is continuously regulated by the electrical means including the vehicle weight sensor 10, controller 11 and drive unit 13. However, an air pressure may be utilized to continuously change the biasing force urging the valve member 88 toward its open position. In a vehicle equipped with suspensions of air spring type, the air pressure of the air springs is proportional to the weight of the vehicle. Therefore, this air pressure may be utilized as the weight signal, and means responsive to this signal may be provided for changing the set force of the spring 91 or changing the biasing force urging the valve member 88 toward its open position.

Figure 7:
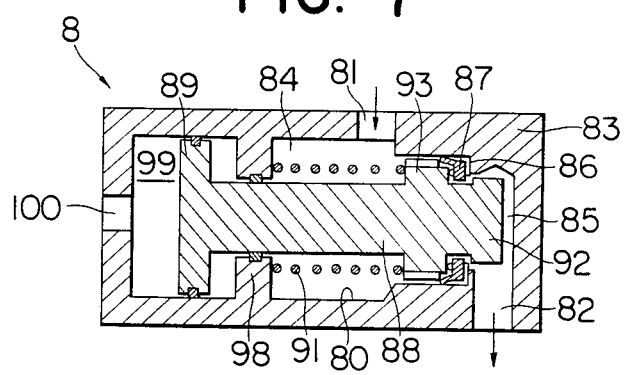
FIG. 7 is a sectional view of a modification of the second variable pressure control valve shown in FIG. 3.

FIG. 7 shows a partial modification of the first embodiment when such air-pressure controlled actuating means is used. In FIG. 7, the same reference numerals are used to designate equivalent parts appearing in FIG. 3.

In the modified second variable pressure control valve 8 shown in FIG. 7, the spring 91 is interposed between the land 93 of the valve member 88 and a partition wall 98 of the inlet pressure chamber 84 to normally urge the valve member 88 toward its open position by a predetermined set force. The left-hand end 89 of the valve member 88 makes sealing and sliding engagement with the inner surface of the bore 80 to define a control pressure chamber 99 together with the end wall of the bore 80. This control pressure chamber 99 is connected directly to the air springs through an inlet port 100. The remaining structure is entirely the same as that shown in FIG. 3.

The operation of this modified second variable pressure control valve 8 is substantially the same as that described with reference to FIG. 3. In the case of FIG. 7, the predetermined force of the spring 91 acts upon the valve member 88 together with the rightward urging force due to the internal air pressure of the control pressure chamber 99 acting upon the pressure receiving area of the left-hand end 89, and this air pressure is proportional to the weight of the vehicle. Therefore, depending on a change of the vehicle weight, the rightward urging force urging the valve member 88 toward the open position changes to change the transition point of the rear-wheel braking force.

Therefore, this modification can also exhibit the effect equivalent to that of the first embodiment.

While the above description refers to application of the present invention to a hydraulic servo brake system, it is apparent that the present invention is equally effectively applicable to an air servo brake system.

In an air servo brake system which is a second emodiment of the present invention and which will be described now, the same reference numerals used in the first embodiment are used to designate equivalent parts.

Figure 8:
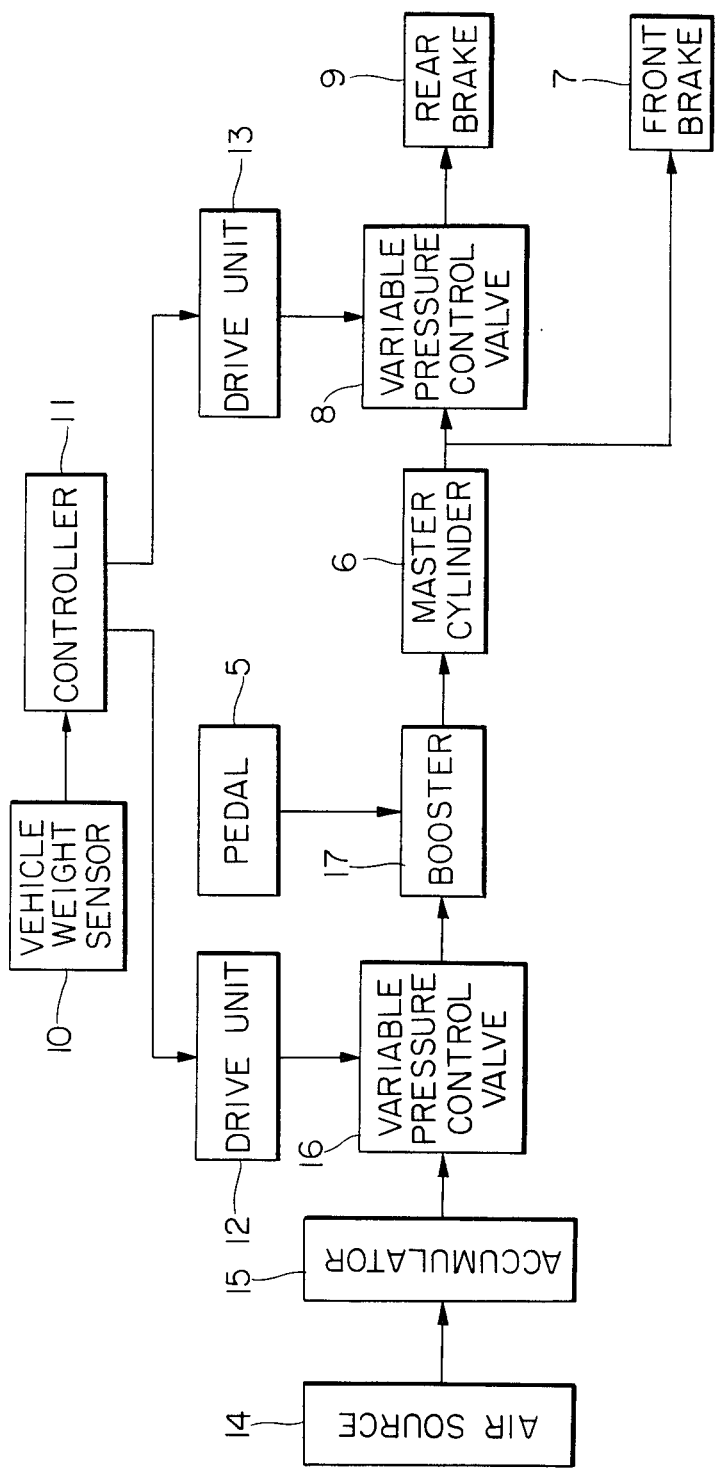
FIG. 8 is a block diagram of a second embodiment of the present invention.

Referring to FIG. 8 which is a block diagram of the second embodiment of the present invention, compressed air generated from an air pressure source 14 such as an air pump is accumulated in an accumulator 15 and is supplied to a booster unit 17 of air pressure type after its pressure is regulated according to the weight of the vehicle by a first variable pressure control valve 16. The booster unit 17 generates an output amplified according to the depression force imparted to the brake pedal 5 thereby actuating the master cylinder 6.

The structure and operation of the remaining component parts 6 to 13 will not be described in detail because they are the same as those in the first embodiment.

Figure 9:
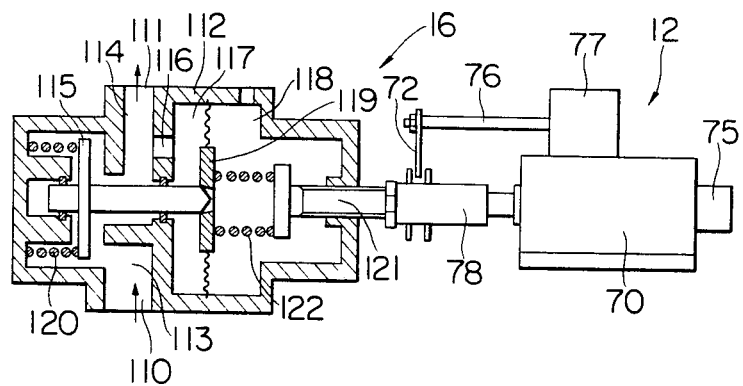
FIG. 9 is a sectional view of the first variable pressure control valve and first drive unit in the second embodiment shown in FIG. 8.

Referring to FIG. 9, the first variable pressure control valve 16 includes a housing 112 having an inlet port 110 connected to the air pressure source 14 and an outlet port 111 connected to the booster unit 17, a valve member 115 disposed slidably in the housing 112 to control communication between an inlet pressure chamber 113 and an outlet pressure chamber 114, a diaphragm 119 secured in the housing 112 to define a pressure chamber 117 communicating with the outlet pressure chamber 114 through a port 116 and also to define an atmospheric pressure chamber 118 communicating with the atmosphere and to control communication between these two chambers 117 and 118 by cooperating with the associated end of the valve member 115, a first spring 120 normally biasing the valve member 115 toward its closed position, and a second spring 122 interposed between an adjusting threaded rod 121 making threaded engagement with the housing 112 and the diaphragm 119 to normally bias the diaphragm 119 in the open direction of the valve member 115. The adjusting threaded rod 121 is connected at its free end in rotary relation, through a spline coupling 78, to the rotary shaft of the motor 70 of the first drive unit 12 described in detail with reference to FIG. 2. Therefore, when the adjusting threaded rod 121 is rotated in one direction, it moves toward the diaphragm 119 to increase the set force of the spring 122, while when it is rotated in the opposite direction, it moves away from the diaphragm 119 to decrease the set force of the spring 122. The plate 72 is mounted on the coupling portion movable in integral relation with the adjusting rod 121.

Figure 10:
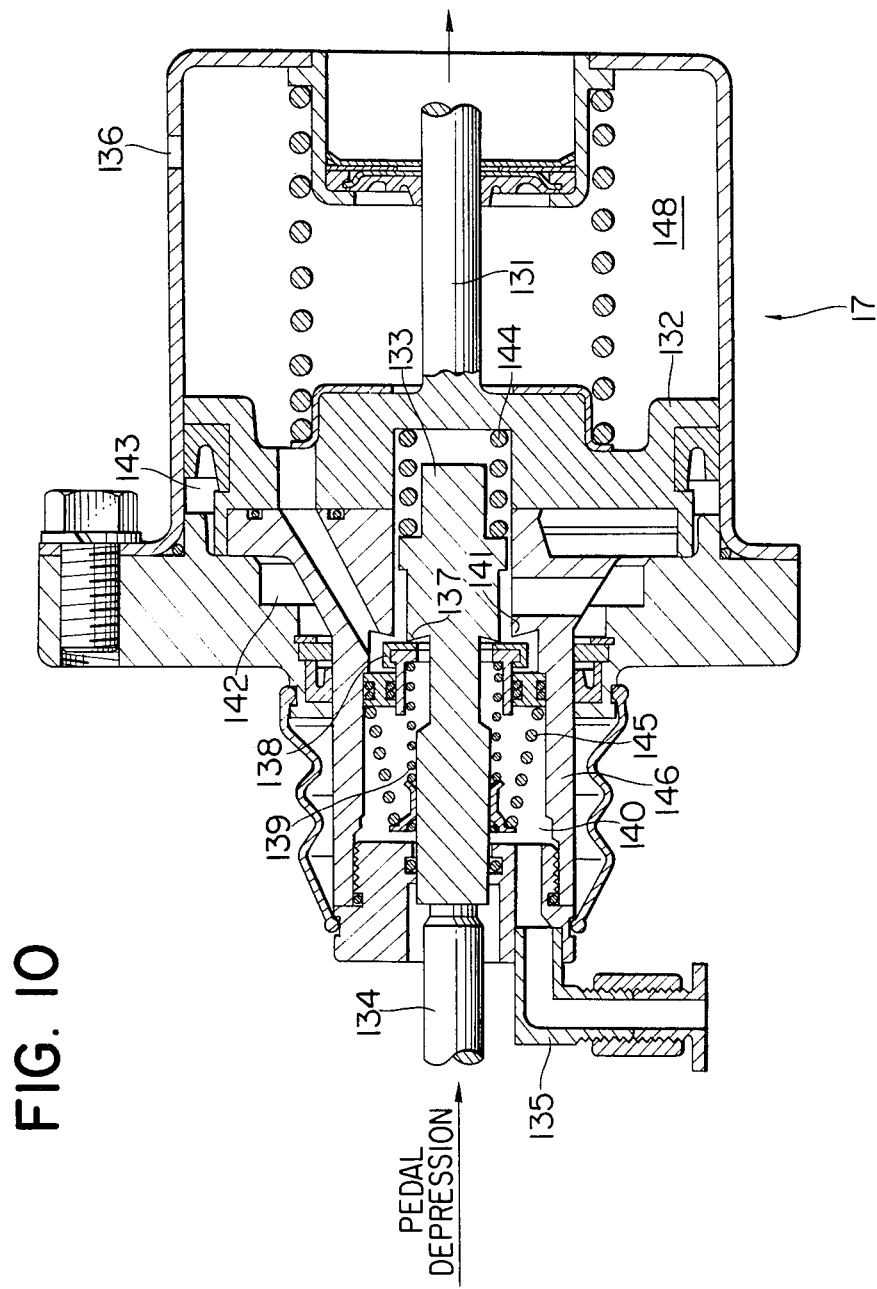
FIG. 10 is a sectional view of the booster unit in the second embodiment shown in FIG. 8.

Referring to FIG. 10 showing the structure of the booster unit 17 of air pressure type, the unit 17 is entirely the same in principle as a known vacuum booster except that a positive pressure is used in lieu of a negative pressure.

Reference numeral 131 designates a rod which is connected to the rod of the master cylinder 6 and corresponds to the rod 57 in the first embodiment. Reference numerals 132, 133 and 134 designate a power piston, a control valve member, and a rod connected to the brake pedal 5, respectively. Reference numerals 135, 136 and 148 designate a pressure pipe conducting compressed air, a discharge port communicating with the atmosphere, and a discharge chamber, respectively.

The operation of the second embodiment will now be described.

At a certain value of the vehicle weight, for example, $W_2$, compressed air supplied from the air pressure source 14 and flowing into the inlet pressure chamber 113 of the first variable pressure control valve 16 is conducted into the outlet pressure chamber 114 by passing around the valve member 115 to be supplied through the outlet port 111 to the inlet port 135 of the booster unit 17. When the internal pressure of the output pressure chamber 114 builds up beyond a certain level, the diaphragm 119 is urged against the force of the spring 122 since the two pressure chambers 114 and 117 communicate with each other through the port 116. The valve member 115 is urged rightward to interrupt communication between the inlet pressure chamber 113 and the outlet pressure chamber 114. Then, when the internal pressure of the outlet pressure chamber 114 is reduced to lower than the above level, the spring 122 biases the diaphragm 119 and valve member 115 leftward to establish communication between the outlet pressure chamber 114 and the inlet pressure chamber 113 again. In this manner, the valve member 115 is maintained in a position at which the force of the spring 122 is balanced by the internal pressure of the pressure chambers 114 and 117 acting upon the diaphragm 119, thereby regulating the air pressure supplied to the booster unit 17 from the outlet pressure chamber 114.

In the absence of any depression force imparted to the brake pedal 5, a projection 137 of the control valve member 133 in the booster unit 17 is pressed against a valve seat 138 by the force of a spring 139, and compressed air supplied by way of the pressure pipe 135 is confined in a chamber 140. In response to the subsequent depression of the brake pedal 5, the valve seat 138 abuts with another projection 141. Then, when the brake pedal 5 is further depressed, the projection 137 moves away from the valve seat 138 to permit flowing of compressed air into a chamber 142. Compressed air flows then into a chamber 143 to cause boosted rightward movement of the power piston 132 followed by corresponding rightward movement of the rod 131.

When the vehicle weight changes during the above operation, the maximum air pressure that can be produced in the chamber 143 of the booster unit 17 is regulated by the first variable pressure control valve 16 to deal with such a weight change thereby controlling the maximum output of the booster unit 17 and the maximum braking fluid pressure of the master cylinder 6, so that, the desired deceleration can be attained regardless of a change of the vehicle weight.

To this end, the displacement of the adjusting threaded rod 121 in the first variable pressure control valve 16 is feedback-controlled by the functions of the vehicle weight sensor 10, controller 11 and first drive unit 12 in a manner similar to that described with reference to the first embodiment. Suppose, for example, that the weight W of the vehicle changes to $W_1$ corresponding to a no-load condition from $W_2$ corresponding to the light-loaded condition described with reference to FIG. 9. In response to such a weight change, the motor 70 is rotated under control of the controller 11 to cause the rotation of the adjusting rod 121 in one direction. The adjusting rod 121 is urged to its predetermined rightwardmost position so that the set force of the spring 122 acting to bias the diaphragm 119 leftward is reduced to its predetermined minimum. As a result, the force due to the internal pressure of the pressure chamber 117 overcomes the force of the spring 122 to urge the diaphragm rightward against the force of the spring 122, thereby interrupting communication between the two pressure chambers 113 and 114 by the valve member 115. At the same time, the associated end of the valve member 115 moves away from the diaphragm 119, with the result that the internal pressure of the outlet pressure chamber 114 is reduced to its predetermined minimum due to discharge of compressed air to the atmosphere through the atmospheric pressure chamber 118. When the internal pressure of the outlet pressure chamber 114 is thus reduced to its predetermined minimum, the diaphragm 119 engages the valve member 115 to hold the valve member 115 in the balanced condition.

When, on the contrary, the vehicle weight W changes to $W_3$ corresponding to a full-loaded condition, the controller 11 responding to such a weight change acts to rotate the motor 70 which causes rotation of the adjusting rod 121 in the opposite direction thereby urging the adjusting rod 121 to its predetermined leftwardmost position, so that the set force of the spring 122 is increased to its predetermined maximum. As a result, the force of the spring 122 overcomes the force due to the internal pressure of the pressure chamber 117 to urge the diaphragm 119 and valve member 115 leftward, and the internal pressure of the outlet pressure chamber 114 is increased to its predetermined maximum. Thereafter, the valve member 115 is maintained in the balanced condition.

In the manner above described, the quantity of air supplied to the booster unit 17 is regulated at a predetermined value in response to a change of the vehicle weight, thereby changing the maximum air pressure in the chamber 143 and the maximum output of the booster unit 17.

The reaction force appearing in response to the depression of the brake pedal 5 is determined by the reaction force of the spring 144 and 145. The reaction force of the springs 144 and 145 is determined by the displacement of the control valve member 133 relative to a piston 146 connected integrally to the power piston 132, and this means that the brake pedal depression force is the same when the displacement of the control valve member 133 is the same.

Thus, in response to a change of the vehicle weight, the displacement of the adjusting rod 121 is changed to change the set force of the spring 122 so that the same depression force imparted to the brake pedal 5 can change the output of the booster unit 17, and the pressure of the braking fluid supplied from the master cylinder 6 can also be changed in corresponding relation. Therefore, the braking force characteristic relative to the brake pedal depression force as shown in FIG. 5 can be exhibited.

The above operation is carried out in synchronism with the rear-wheel braking force control operation by the second variable pressure control valve 8 described in detail with reference to the first embodiment, so that the front-wheel and rear-wheel braking force distribution characteristic shown in FIG. 6 can be exhibited.

Therefore, this second embodiment can also exhibit the effect equivalent to that of the first embodiment.

Figure 11:
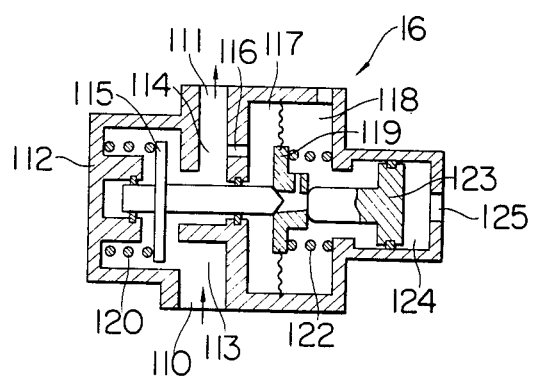
FIG. 11 is a sectional view of a modification of the variable pressure control valve shown in FIG. 9.

FIG. 11 shows a partial modification of the second embodiment, in which air-pressure controlled actuating means is used so that the leftward urging force imparted to the diaphragm 119 in the first variable pressure control valve 16 can be changed in response to a change of the vehicle weight. In FIG. 11, the same reference numerals are used to designate equivalent parts appearing in FIG. 9.

In the modified first variable pressure control valve 16 shown in FIG. 11, the spring 122 is interposed between the diaphragm 119 and the housing 112 to normally bias the diaphragm 119 leftward by a predetermined set force. A piston 123 which is sealed in the housing 112 to be slidable therein defines a control pressure chamber 124 together with the housing 112 and is engaged by the diaphragm 119. This control pressure chamber 124 is connected directly to the air springs of the suspensions of air spring type described with reference to FIG. 7. The remaining structure is the same as that in FIG. 9.

The operation of this modified first variable pressure control valve 16 is substantially the same as that shown in FIG. 9. In FIG. 11, the combination of the constant force of the spring 122 and the force due to the internal air pressure of the control pressure chamber 124 acting upon the piston 123 acts upon the right-hand surface of the diaphragm 119. Since the air pressure in the chamber 124 is proportional to the weight of the vehicle as described already, the pressure of air supplied to the booster unit 17 changes according to a change of the vehicle weight.

It is therefore apparent that the effect exhibited by this modification is equivalent to that exhibited by the first embodiment.

Figure 12:
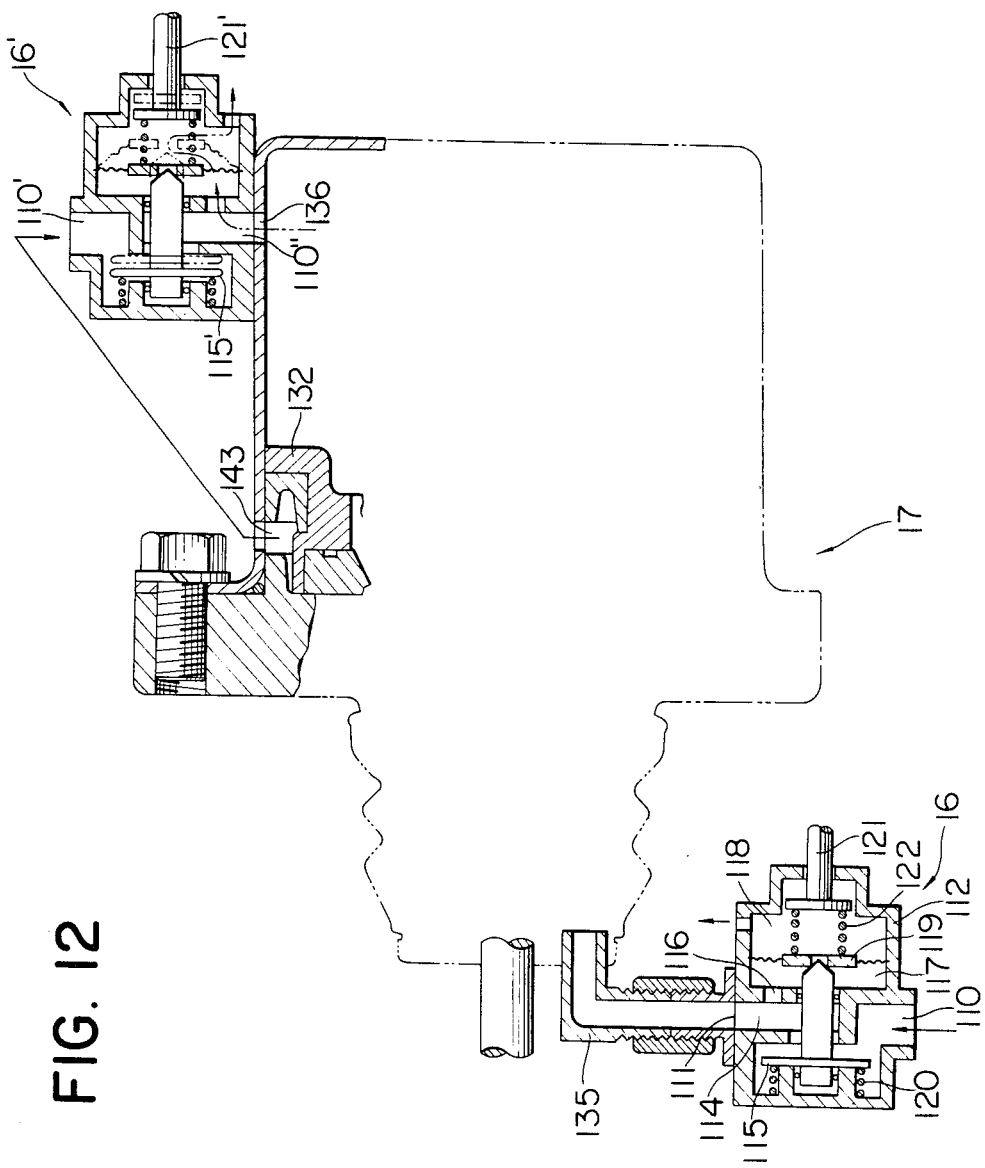
FIG. 12 is a sectional view of part of a third embodiment of the present invention.

A third embodiment shown in FIG. 12 is a modification of the second embodiment shown in FIG. 8. The booster unit 17 is entirely similar to that included in the second embodiment, and the structure and function of the variable pressure control valve 16 connected to the pressure pipe 135 are also similar to those of the valve 16 included in the second embodiment.

The third embodiment differs from the second embodiment in that a variable pressure control valve 16' similar in structure to the variable pressure control valve 16 is additionally provided for controlling a back pressure applied to the booster unit 17. Referring to FIG. 12, the additional variable pressure control valve 16' communicates at an inlet port 110' with the chamber 143 of the booster unit 17 and at another inlet port 110" with the discharge port 136 of the booster unit 17. When the vehicle is in its heavy-loaded condition, an adjusting threaded rod 121' connected to the drive unit 5 is in its rightward shifted position.

In this third embodiment, the internal pressure of the chamber 143 of the booster unit 17 is regulated by a valve member 115' taking a different position depending on the position of the adjusting rod 121'. During rightward movement of the power piston 132, air to be primarily discharged to the atmosphere through the discharge port 136 is discharged to the atmosphere by way of a path as shown by the imaginary line in FIG. 12, and the adjusting rod 121' acts to throttle this air flow path. That is, when the adjusting rod 121' is in its rightward shifted position shown by the imaginary lines, the air flow path is not throttled. Therefore, no back pressure is imparted, and the piston 132 is smoothly movable to permit impartation of a strong braking force. Thus, application of a back pressure to the port 136 from the additional variable pressure control valve 16' increases the brake pedal depression force to such an extent that the depression force imparted in a light-loaded condition is substantially the same as that in a heavy-loaded condition.

When the brake switch is in its off position, the adjusting rod 121' is necessarily moved rightward to the imaginary-line position shown in FIG. 12 so as not to produce the back pressure. Otherwise, the piston 132 will not move smoothly, and the driver will have a feeling of disorder in the actuation of the brakes.

Figure 13:
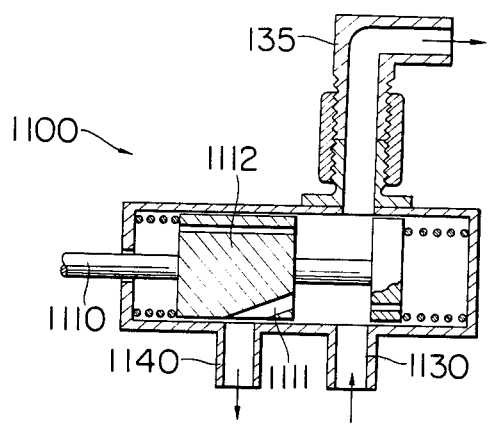
FIG. 13 is a sectional view of part of a fourth embodiment of the present invention.
Figure 14:
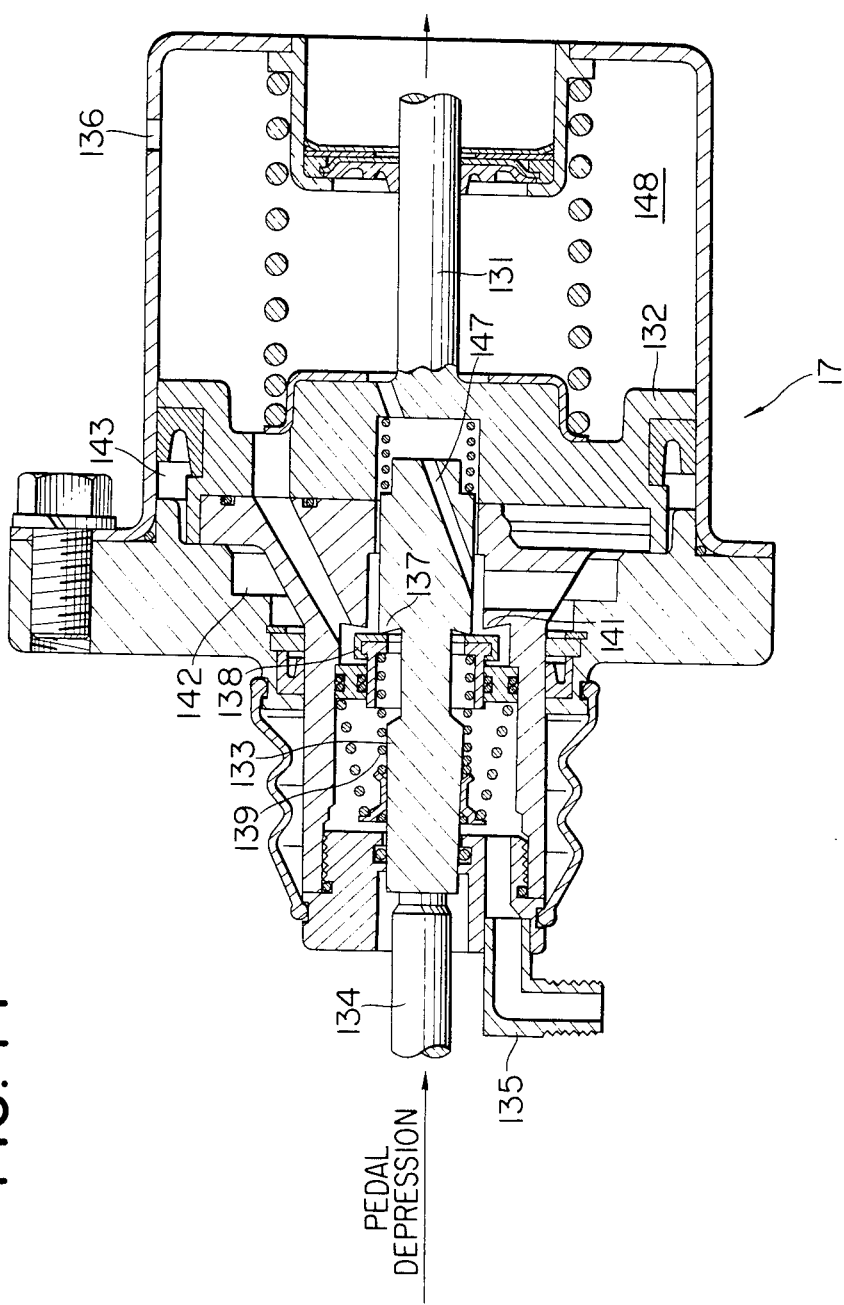
FIG. 14 is also a sectional view of part of the fourth embodiment of the present invention.

FIGS. 13 and 14 show a fourth embodiment of the present invention. In this fourth embodiment, the booster unit 17 employed in the second embodiment is modified, and the variable pressure control valve 16 is replaced by a variable pressure control valve 1100.

Referring to FIGS. 13 and 14, the first variable pressure control valve 1100 has an inlet port 1130 connected to the source of compressed air and an outlet port 1140 connected to the atmosphere, and includes a rod 1110 corresponding to the rod 121 in the second embodiment. This rod 1110 is connected integrally to a piston 1112 having a port 1111 so that the opening of the port 1111 changes with the movement of the rod 1110 in the axial direction.

A booster unit 17 in this embodiment differs from the booster unit 17 in said second embodiment only in that the relative movement of the control valve member 133 and the power piston 132 reduces the sectional area of an air vent port 147 formed in the control valve member 133 to increase the internal pressure of the chamber 143.

Figure 15:
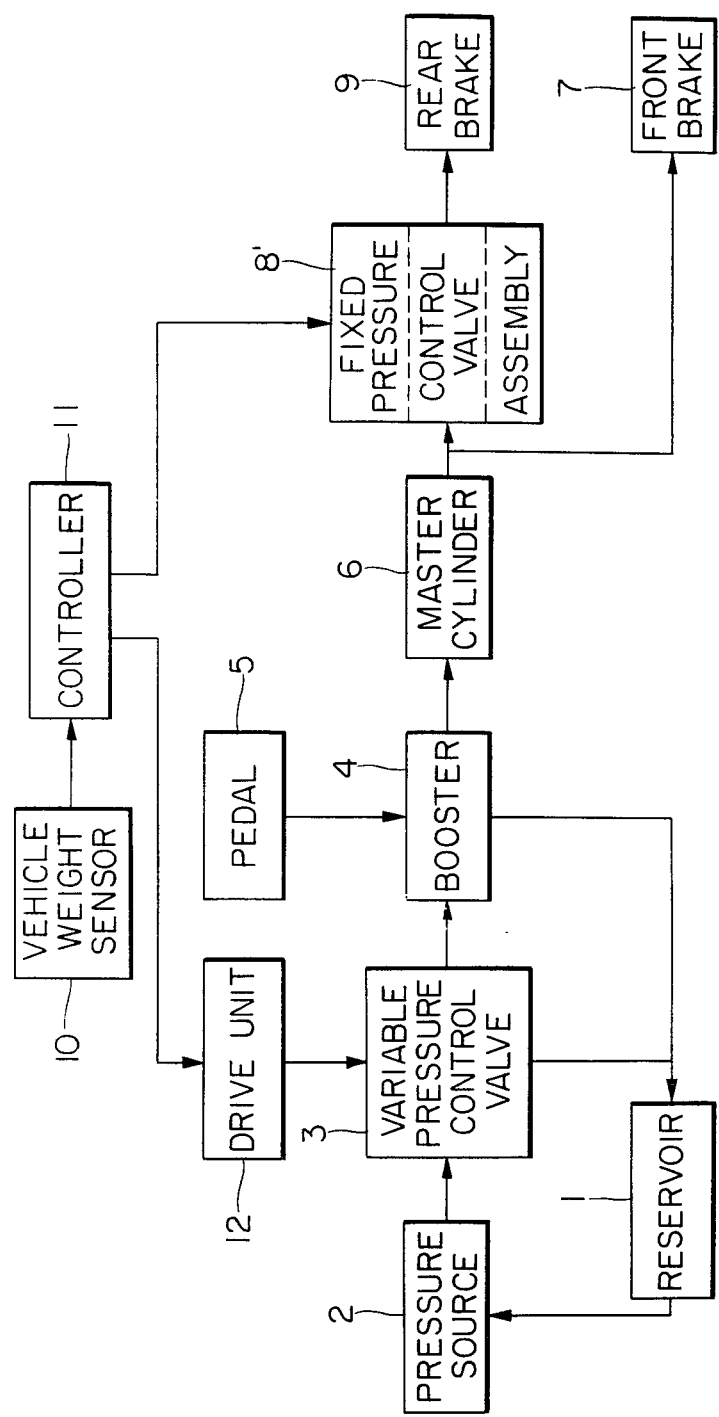
FIG. 15 is a block diagram of a fifth embodiment of the present invention.
Figure 16:
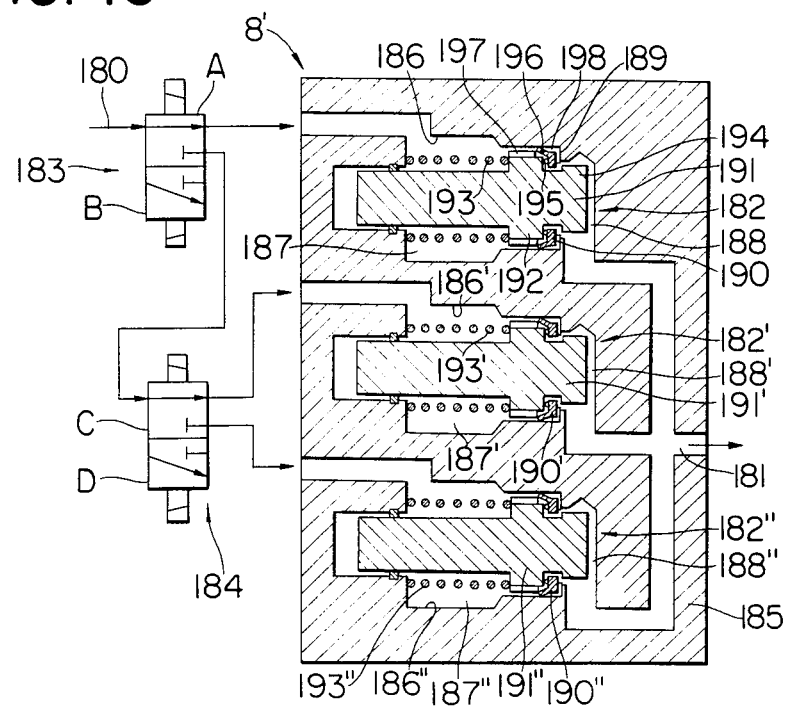
FIG. 16 is a sectional view of the fixed pressure control valve assembly in the fifth embodiment shown in FIG. 15.

FIGS. 15 and 16 show a fifth embodiment of the present invention. In this fifth embodiment, the second variable pressure control valve 8 shown in FIG. 1 is replaced by a fixed pressure control valve assembly 8' to eliminate the provision of the second drive unit 13, and this fixed pressure control valve assembly 8' is controlled directly by the controller 11. The remaining structure is the same as that shown in FIG. 1.

The fixed pressure control valve assembly 8' in this fifth embodiment includes three pressure control valves having different operating characteristics, and the controller 11 acts to selectively actuate one of these three pressure control valves corresponding to the vehicle weight indicated by the weight signal applied from the vehicle weight sensor 10.

More precisely, referring to FIG. 16, the fixed pressure control valve assembly 8' includes three pressure control valves 182, 182' and 182" supplying hydraulic fluid at regulated pressure to an outlet port 181 connected to the rear brakes 9, and two selector valves 183 and 184 of, for example, electromagnetically operated type for selectively changing over the path of the hydraulic fluid supplied from an inlet conduit 180 connected to the master cylinder 6 so as to selectively supply the hydraulic fluid to one of the pressure control valves 182, 182' and 182".

The selector valve 183 is changed over between a position A at which the hydraulic fluid from the inlet conduit 180 is supplied to the pressure control valve 182 and a position B at which the hydraulic fluid is supplied to the selector valve 184. The selector valve 184 is changed over between a position C at which the supplied hydraulic fluid is supplied to the pressure control valve 182' and a position D at which the hydraulic fluid is supplied to the pressure control valve 182". The selector valves 183 and 184 are changed over under control of the controller 11.

Since the fundamental structure and function of these three pressure control valves 182, 182' and 182" are substantially the same, the structure and function of the pressure control valve 182 will only be described, and those of the remaining two pressure control valves 182' and 182" will be dispensed with while affixing the dash and double dash to the corresponding parts of the valves 182' and 182".

The pressure control valve 182 includes a piston-shaped valve member 191 slidably disposed in a stepped bore 186 formed in a housing 185 to define an inlet pressure chamber 187 and an outlet pressure chamber 188 and also to cooperate with an annular seal 190 mounted on a step portion 189 of the bore 186 for controlling communication between the two pressure chambers 187 and 188, and a spring 193 interposed between the wall of the bore 186 and a land 192 of the valve member 191 to normally bias the valve member 191 rightward or toward the open position shown in FIG. 16.

In this open position of the pressure control valve 182, the small-diameter right-hand end 194 of the valve member 191 is not engaged by the seal 190, and the land 192 of the valve member 191 is engaged by a plurality of projections 195 provided on the seal 190 in circumferentially spaced apart relation. Further, in the illustrated open position, an annular lip 196 of the seal 190 is in pressure engagement with the inner surface of the bore 186. Therefore, the inlet pressure chamber 187 communicates with the outlet pressure chamber 188 through a plurality of grooves 197 formed on the outer periphery of the land 192 and through the gap between the seal 190 and the valve member 191. The seal 190 is formed at its bottom and outer peripheral portions with grooves 198 which permit flow of the hydraulic fluid from the outlet pressure chamber 188 toward the inlet pressure chamber 187 when the brakes are released. The fundamental function of the individual pressure control valves 182, 182' and 182" is substantially the same as that of the second variable pressure control valve 8 shown in FIG. 3, and any detailed description thereof is unnecessary.

The control function of the fixed pressure control valve assembly 8' will now be described in detail.

In response to the application of the weight signal from the vehicle weight sensor 10, the controller 11 identifies one of predetermined vehicle weight ranks, that is, for example, a rank $W_1$ corresponding to a no-loaded condition, a rank $W_2$ corresponding to a half-loaded condition and a rank $W_3$ corresponding to the full-loaded condition, in this fifth embodiment.

When now the controller 11 detects the weight rank $W_1$, the selector valve 183 is changed over to the position A so that the hydraulic fluid supplied from the inlet conduit 180 during braking is supplied to the rear brakes 9 through the pressure control valve 182 and outlet port 181. Since this valve 182 has a small set force $F_1$ of its spring 193, the above manner of operation of the valve 182 sets the outlet pressure of the transition point at a predetermined low level. On the other hand, when the controller 11 detects the weight rank $W_2$, the selector valve 183 is changed over to the position B, and the selector valve 184 is changed over to the position C. As a result, the hydraulic fluid from the inlet conduit 180 is supplied to the pressure control valve 182' having a larger set force $F_2$ of its spring 193' than the set force $F_1$, and the outlet pressure at the transition point is set at a predetermined intermediate level by the operation of the valve 182' in a similar manner. Further, when the controller 11 detects the weight rank $W_3$, the selector valve 184 is changed over to the position D, while the selector valve 183 is maintained in the position B. As a result, the hydraulic fluid from the inlet conduit 180 is supplied to the pressure control valve 182" having a larger spring set force $F_3$ than the set force $F_2$, and the outlet pressure at the transition point is set at a predetermined high level by the operation of the valve 182" in a similar manner. Thus, in this fifth embodiment too, the braking hydraulic fluid at one of different pressures corresponding to the sensed weight ranks respectively is supplied to the rear brakes 9 to exhibit the front-wheel and rear-wheel braking force distribution characteristics shown by the solid curves in FIG. 6.

Figure 18:
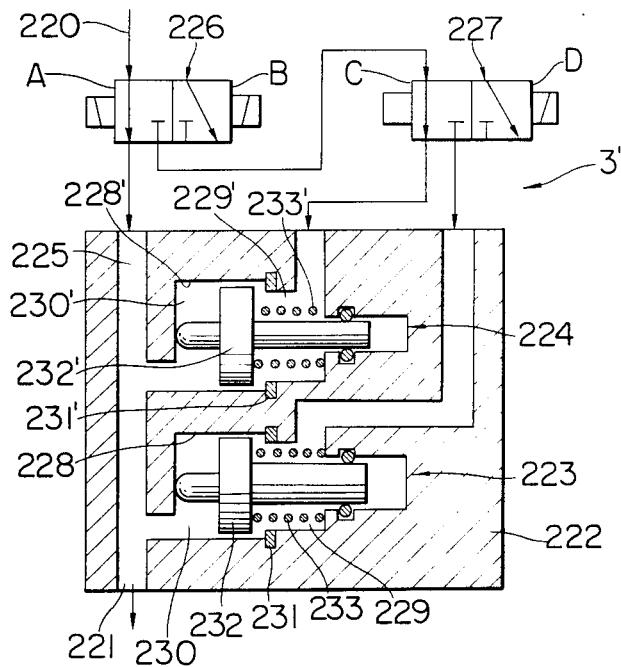
FIG. 18 is a sectional view of part of the sixth embodiment shown in FIG. 17.
Figure 17:
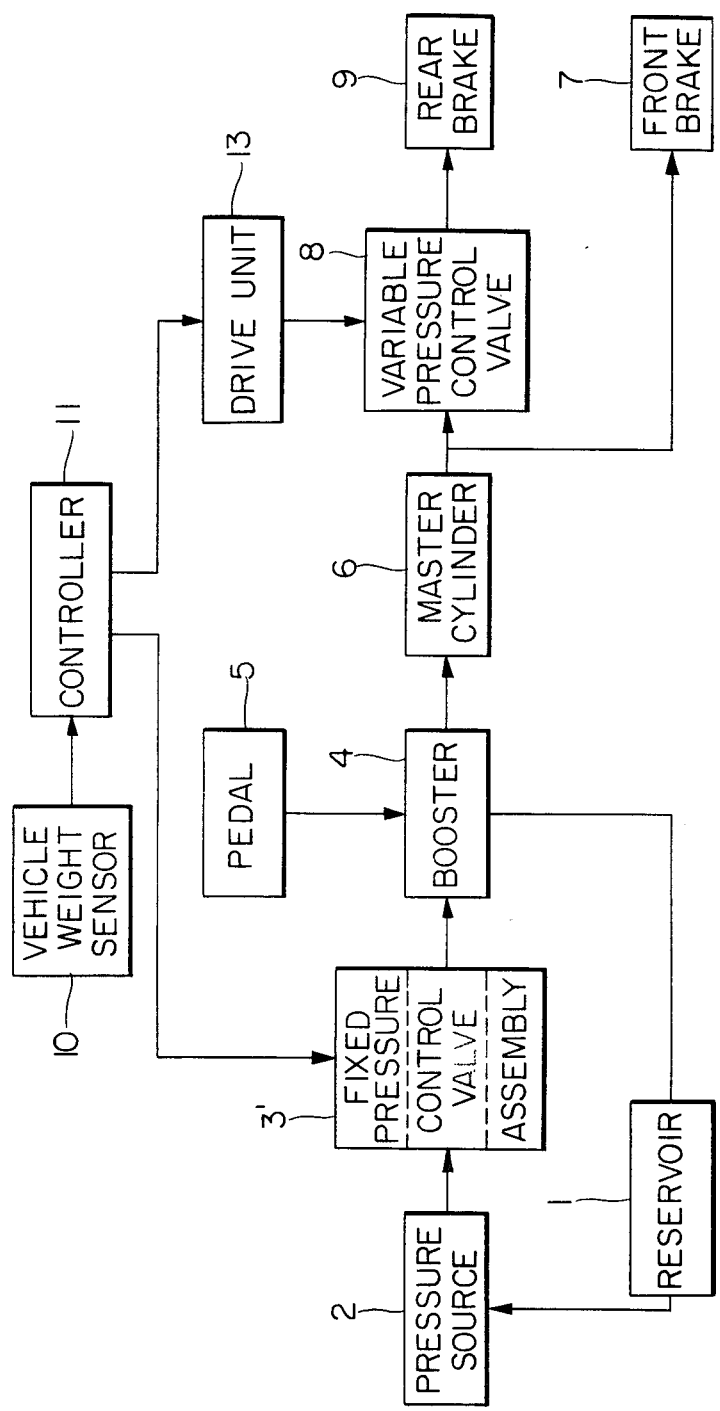
FIG. 17 is a block diagram of a sixth embodiment of the present invention.

FIGS. 17 and 18 show a sixth embodiment of the present invention. In this sixth embodiment, the first variable pressure control valve 3 shown in FIG. 1 is replaced by a fixed pressure control valve assembly 3' to eliminate the provision of the first drive unit 12, and this fixed pressure control valve assembly 3' is controlled directly by the controller 11. The remaining structure is the same as that shown in FIG. 1.

Referring to FIG. 18, the fixed pressure control valve assembly 3' includes three pressure control circuits having different operating characteristics, and the controller 11 acts to selectively actuate one of these three pressure control circuits corresponding to the vehicle weight indicated by the weight signal applied from the vehicle weight sensor 10. More precisely, the fixed pressure control valve assembly 3' controls the pressure of hydraulic fluid from the fluid pressure source 2 depending on the sensed vehicle weight and includes a first pressure control circuit including a pressure control valve 223 disposed in a housing 222 for supplying the hydraulic fluid from an inlet conduit 220 connected to the fluid pressure source 2 to an outlet port 221 connected to the booster unit 4, a second pressure control circuit including a pressure control valve 224 for supplying the hydraulic fluid at regulated pressure to the outlet port 221 with a characteristic different from that of the pressure control valve 223, a third pressure control circuit including a communication passage 225 formed in the housing 222 for directly supplying the hydraulic fluid from the inlet conduit 220 to the outlet port 221, and two selector valves 226 and 227 of, for example, electromagnetically operated type for selectively changing over the path of the hydraulic fluid supplied from the inlet conduit 220 so as to supply the hydraulic fluid to the selected one of the pressure control circuits.

The selector valve 226 is changed over between a position A at which the hydraulic fluid from the inlet conduit 220 is supplied to the communication passage 225 and a position B at which the hydraulic fluid is supplied to the selector valve 227. The selector valve 227 is changed over between a position C at which the supplied hydraulic fluid is supplied to the pressure control valve 224 and a position D at which the hydraulic fluid is supplied to the pressure control valve 223. The selector valves 226 and 227 are changed over under control of the controller 11.

Since the fundamental structure and function of the two pressure control valves 223 and 224 are substantially the same, the structure and function of the pressure control valve 223 will only be described, and those of the other pressure control valve 224 will be dispensed with while affixing the dash to the corresponding parts of the valve 224.

The pressure control valve 223 includes a piston-shaped valve member 232 slidably disposed in a stepped bore 228 formed in the housing 222 to define an inlet pressure chamber 229 and an outlet pressure chamber 230 and also to cooperate with an annular seal 231 mounted on a step portion of the bore 228 for controlling communication between the two pressure chambers 229 and 230, and a spring 233 interposed between the wall of the bore 228 and the valve member 232 to normally bias the valve member 232 leftward or toward the open position shown in FIG. 18. The inlet pressure in the inlet pressure chamber 229 acting upon the end having a small pressure receiving area provides a force tending to urge the valve member 232 leftward or in the opening direction, and the outlet pressure in the outlet pressure chamber 230 acting upon the end having a large pressure receiving area provides a force tending to urge the valve member 232 rightward or in the closing direction. Due to the fact that the force of the spring 233 is very weak or is merely required to position the valve member 232 in the open position, the output pressure is maintained at a low level corresponding to the ratio between the two pressure receiving areas of the valve member 232. Further, because of the fact that the rod diameter of the valve member 232 in the pressure control valve 223 is larger than that of the valve member 232' in the pressure control valve 224, the ratio between the pressure receiving areas of the pressure control valve 223 is larger than that of the pressure control valve 224, and, therefore, the outlet pressure of the former is lower than that of the latter.

The control function of the fixed pressure control valve assembly 3' will now be described.

The vehicle weight W is sensed by the vehicle weight sensor 10, and the weight signal indicative of the sensed weight is applied to the controller 11. In response to the application of the weight signal from the sensor 10, the controller 11 identifies one of predetermined weight ranks, that is, for example, a rank $W_1$ corresponding to a no-loaded condition, a rank $W_2$ corresponding to a half-loaded condition and a rank $W_3$ corresponding to a full-loaded condition, and controls the selector valves 226 and 227 so that one of the pressure control circuits corresponding to the identified weight rank is actuated in the fixed pressure control valve assembly 3'.

When now the controller 11 detects the weight rank $W_1$, the selector valve 226 is changed over to the position B, and the selector valve 227 is changed over to the position D. As a result, the hydraulic fluid from the inlet conduit 220 is supplied to the pressure control valve 223 in which the ratio between the pressure receiving areas is larger than that of the pressure control valve 224, and the valve member 232 cooperates with the seal 231 to lower the outlet pressure than the inlet pressure in proportion to the above ratio thereby setting the outlet pressure at a predetermined low level. On the other hand, when the controller 11 detects the weight rank $W_2$, the selector valve 227 is changed over to the position C, while the selector valve 226 is maintained in the position B. The hydraulic fluid from the inlet conduit 220 is supplied to the pressure control valve 224 in which the ratio between the pressure receiving areas is smaller than that of the pressure control valve 223, and the valve member 232' cooperates with the seal 231' to lower the outlet pressure than the inlet pressure in proportion to the above ratio thereby setting the outlet pressure at a predetermined intermediate level. Further, when the controller 11 detects the weight rank $W_3$, the selector valve 226 is changed over to the position A. The hydraulic fluid from the inlet conduit 220 is supplied to the communication passage 225 to be directly supplied to the outlet port 221. In this manner, the hydraulic fluid from the fluid pressure source 2 is regulated to meet the detected weight rank, and the hydraulic fluid at the regulated pressure is supplied to the booster unit 4, so that the maximum pressure of hydraulic fluid in the pressure chamber 44, hence, the maximum output of the booster unit 4 can be set at a predetermined value.

In a seventh embodiment of the present invention shown in FIG. 19, the first variable pressure control valve 16 shown in FIG. 8 is replaced by a fixed pressure control valve assembly 16'', as in the case of the sixth embodiment.

Referring to FIG. 19, this fixed pressure control valve assembly 16'' includes three pressure control circuits including three pressure control valves 202, 202' and 202'' respectively for regulating the air pressure from an inlet conduit 200 connected to the air pressure source 14 and supplying air at the regulated pressure to an outlet conduit 201 connected to the booster unit 17, and three on-off valves 203, 204 and 205 of, for example, electromagnetically operated type which are selectively opened and closed for supplying compressed air from the inlet conduit 200 to the outlet conduit 201 through the selected one of the pressure control circuits.

The on-off valves 203 and 204 are disposed in the first and second pressure control circuits between the pressure control valves 202, 202' and the outlet conduit 201, while the on-off valve 205 is disposed in the third pressure control circuit between the inlet conduit 200 and the pressure control valve 202''. The pressure control valves 202, 202' and 202'' are opened and closed under control of the controller 11.

Since the fundamental structure and function of these three pressure control valves 202, 202' and 202'' are substantially the same, the structure and function of the pressure control valve 202 will only be described to dispense with the description of the remaining pressure control valves 202' and 202'' while affixing the dash and double dash to the corresponding parts.

The pressure control valve 202 includes a valve member 209 slidably disposed in a housing 206 to control communication between an inlet pressure chamber 207 and an outlet pressure chamber 208, a diaphragm 213 secured in the housing 206 to define a pressure chamber 211 communicating with the outlet pressure chamber 208 through a port 210 and also an atmospheric pressure chamber 212 communicating with the atmosphere and to control communication between the two chambers 211 and 212 by cooperating with the associated end of the valve member 209, a spring 214 biasing the valve member 209 toward its closed position, and a spring 215 interposed between the housing 206 and the diaphragm 213 to normally bias the valve member 209 toward its open position. The force of the spring 214 is very weak such that it can only cause movement of the valve member 209 following that of the diaphragm 213. The fundamental function of the pressure control valves 202, 202' and 202'' is substantially the same as that of the variable pressure control valve 16 shown in FIG. 11, and, therefore, any detailed description is unnecessary.

The control function of the fixed pressure control valve assembly 16'' will now be described.

In response to the application of the weight signal from the vehicle weight sensor 10 sensing the weight of the vehicle, the controller 11 identifies one of a weight rank $W_1$ corresponding to a no-loaded condition, a weight rank $W_2$ corresponding to a half-loaded condition and a weight rank $W_3$ corresponding to a full-loaded condition.

When now the controller 11 detects the weight rank $W_1$, the on-off valves 204 and 205 are closed and the on-off valve 203 is opened under control of the controller 11. As a result, compressed air is supplied from the inlet conduit 200 to the booster unit 17 through the pressure control valve 202. Since this valve 202 has a small set force $F_1$ of its spring 215, the above manner of operation of the valve 202 sets the internal pressure of the outlet pressure chamber 208 at a predetermined low level. On the other hand, when the controller 11 detects the weight rank $W_2$, the on-off valves 203 and 205 are closed and the on-off valve 204 is opened under control of the controller 11. As a result, compressed air from the inlet conduit 200 is supplied to the booster unit 17 through the pressure control valve 202' having a larger set force $F_2$ of its spring 215' than the set force $F_1$, and the internal pressure of the outlet pressure chamber 208' is set at a predetermined intermediate level by the operation of the valve 202' in a similar manner. Further, when the controller 11 detects the weight rank $W_3$, the on-off valves 203 and 204 are closed and the on-off valve 205 is opened under control of the controller 11. As a result, compressed air from the inlet conduit 200 is supplied to the booster unit 17 through the pressure control valve 202'' having a larger set force $F_3$ of its spring 215'' than the set force $F_2$, and the internal pressure of the outlet pressure chamber 208'' is set at a predetermined high level by the operation of the valve 202'' in a similar manner. Thus, compressed air from the air pressure source 14 regulated to meet the vehicle weight rank is supplied to the booster unit 17 so that the maximum air pressure in the chambers 142 and 143 and the output of the booster unit 17 can be set at predetermined values.

The fifth embodiment shown in FIGS. 15 and 16 may be combined with the sixth embodiment shown in FIGS. 17 and 18 to replace the variable pressure control valves 3 and 8 by the fixed pressure control valve assemblies 3' and 8' respectively. Further, the fixed pressure control valve assemblies 16" and 8' may replace the respective variable pressure control valves 16 and 8 when air pressure circuits are employed for the control.

What is claimed is:

1. A brake system for a vehicle comprising:
   booster means including a cylinder, a piston disposed for sliding movement in said cylinder, a pressure chamber defined between said cylinder and said piston, and a valve member arranged for interlocking movement with a brake pedal and disposed slidably in said piston for controlling flow of pressure fluid from a fluid pressure source into said pressure chamber;
   pressure control valve means disposed between said fluid pressure source and said booster means and operative to control a permissible maximum pressure generated in said pressure chamber of said booster means;
   control means for controlling the operation of said pressure control valve means so as to change said permissible maximum pressure depending on a change of the weight of the vehicle; and
   a master cylinder connected to said piston of said booster means to supply braking hydraulic fluid at controlled pressure to the front and rear brakes.

2. A brake system as claimed in claim 1, wherein said pressure control valve means includes a plurality of pressure control circuits capable of producing one of different maximum fluid pressures in said pressure chamber of said booster means, and selector valves selectively actuated for selecting the corresponding one of said pressure control circuits depending on the weight of the vehicle.

3. A brake system as claimed in claim 1, further comprising second pressure control valve means disposed between said master cylinder and said rear brakes for reducing the rate of increase of the pressure of the hydraulic fluid supplied from said master cylinder to said rear brakes relative to the rate of increase of the pressure of the hydraulic fluid at the outlet of said master cylinder when the pressure of the hydraulic fluid at the outlet of said master cylinder exceeds a setting, said second pressure control valve means being controlled by said control means so as to change said setting depending on a change of the weight of the vehicle.

4. A brake system as claimed in claim 3, wherein said second pressure control valve means includes a plurality of pressure control valves for reducing the rate of increase of the pressure of the hydraulic fluid supplied from said master cylinder to said rear brakes relative to the rate of increase of the pressure of the hydraulic fluid at the outlet of said master cylinder when the pressure of the hydraulic fluid at the outlet of said master cylinder exceeds one of settings different from one another, and selector valves selectively actuated for selecting the corresponding one of said pressure control valves depending on the weight of the vehicle.

5. A brake system as claimed in claim 3, wherein the setting of said second pressure control valve means is controlled by the pressure of air in air spring type suspension means of the vehicle, said suspension means forming said control means.

6. A brake system as claimed in claim 1, wherein said booster means includes a discharge chamber defined on the opposite side of said pressure chamber relative to said piston, said valve member permitting communication between said discharge chamber and said pressure chamber when the brake pedal is not actuated, but permitting communication between said pressure chamber and said fluid pressure source when the brake pedal is actuated, and wherein a back pressure control valve is disposed in a fluid discharge path for controlling a back pressure in said discharge chamber of said booster means and is biased towards its closed position, the opening degree of said back pressure control valve increasing depending on an increase of said back pressure, and drive means is provided for controlling a valve closing force biasing said pressure control valve towards its closed position in a relation inversely proportional to the weight of the vehicle.

7. A brake system for a vehicle comprising:
   booster means including a cylinder, a piston disposed for sliding movement in said cylinder, a pressure chamber defined between said cylinder and said piston, and a valve member arranged for interlocking movement with a brake pedal and disposed slidably in said piston for controlling flow of pressure fluid from a fluid pressure source into said pressure chamber;
   pressure control valve means disposed between said fluid pressure source and said booster means for controlling the maximum internal pressure of said pressure chamber of said booster means depending on the weight of the vehicle;
   a master cylinder connected to said piston of said booster means to supply braking hydraulic fluid at controlled pressure to the front and rear brakes said booster means including a discharge chamber defined on the opposite side of said pressure chamber relative to said piston, said valve member permitting communication between said discharge chamber and said pressure chamber when the brake pedal is not actuated, but permitting communication between said pressure chamber and said fluid pressure source when the brake pedal is actuated, and wherein a second pressure control valve means communicates with said discharge chamber of said booster means, biasing means engaging said second pressure control valve means to urge it towards its closed position, and drive means is provided for controlling the valve closing force produced by said biasing means to urge said second pressure control valve means towards its closed position in a relation inversely proportional to the weight of the vehicle.

* * * * *